United States Patent
Iwasaki et al.

(10) Patent No.: US 9,624,366 B2
(45) Date of Patent: *Apr. 18, 2017

(54) CROSSLINKABLE HALOGEN-FREE RESIN COMPOSITION, CROSS-LINKED INSULATED WIRE AND CABLE

(71) Applicant: Hitachi Metals, Ltd., Tokyo (JP)

(72) Inventors: Makoto Iwasaki, Hitachi (JP); Ryutaro Kikuchi, Mito (JP); Mitsuru Hashimoto, Hitachi (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/931,456

(22) Filed: Nov. 3, 2015

(65) Prior Publication Data

US 2016/0163417 A1 Jun. 9, 2016

(30) Foreign Application Priority Data

Dec. 3, 2014 (JP) ................. 2014-245104

(51) Int. Cl.
*H01B 7/00* (2006.01)
*C08L 23/26* (2006.01)
*C08L 23/06* (2006.01)
*H01B 3/30* (2006.01)
*H01B 3/44* (2006.01)

(52) U.S. Cl.
CPC ............ *C08L 23/26* (2013.01); *C08L 23/06* (2013.01); *H01B 3/308* (2013.01); *H01B 3/441* (2013.01); *H01B 3/447* (2013.01); *H01B 3/448* (2013.01); *C08L 2203/202* (2013.01); *C08L 2312/00* (2013.01)

(58) Field of Classification Search
CPC .......................... H01B 7/0208; H01B 7/295
USPC .......................... 174/110 R, 120 R, 121 A
See application file for complete search history.

(56) References Cited

U.S. PATENT DOCUMENTS 5,376,739 A * 12/1994 Pfleger ................ C08F 210/02
526/329
6,232,377 B1 * 5/2001 Hayashi ................ C08K 3/24
524/100

(Continued)

FOREIGN PATENT DOCUMENTS

JP 2002-060557 A 2/2002
JP 2004-156026 A 6/2004

OTHER PUBLICATIONS

United States Office Action dated Aug. 19, 2016 in co-pending U.S. Appl. No. 14/733,803.

(Continued)

*Primary Examiner* — Chau N Nguyen
(74) *Attorney, Agent, or Firm* — McGinn IP Law Group, PLLC.

(57) ABSTRACT

A crosslinkable halogen-free resin composition includes a polymer blend, and a metal hydroxide mixed in an amount of 120 to 200 parts by mass per 100 parts by mass of the polymer blend. The polymer blend includes a high-density polyethylene, 30 to 50 parts by mass of an ethylene-acrylic ester-maleic anhydride terpolymer, 5 to 20 parts by mass of a maleic anhydride modified ethylene-α-olefin copolymer and 10 to 30 parts by mass of an ethylene-vinyl acetate copolymer.

5 Claims, 2 Drawing Sheets

(56) References Cited

U.S. PATENT DOCUMENTS

| | | | | |
|---|---|---|---|---|
| 8,097,809 B2* | 1/2012 | Galletti | ............. | H01B 7/295 |
| | | | | 174/110 R |
| 2007/0149680 A1* | 6/2007 | Kim | ............. | C08K 3/22 |
| | | | | 524/436 |
| 2007/0187130 A1* | 8/2007 | Park | ............. | H02G 3/14 |
| | | | | 174/68.1 |
| 2011/0240335 A1* | 10/2011 | Grizante Redondo | . | C08L 23/04 |
| | | | | 174/116 |
| 2013/0149453 A1* | 6/2013 | Romick | ............. | C09D 151/06 |
| | | | | 427/385.5 |

OTHER PUBLICATIONS

United States Office Action dated Aug. 19, 2016 in co-pending U.S. Appl. No. 14/931,466.

\* cited by examiner

CROSSLINKABLE HALOGEN-FREE RESIN COMPOSITION, CROSS-LINKED INSULATED WIRE AND CABLE

The present application is based on Japanese patent application No. 2014-245104 filed on Dec. 3, 2014, the entire contents of which are incorporated herein by reference.

BACKGROUND OF THE INVENTION

1. Field of the Invention

The invention relates to a crosslinkable halogen-free resin composition as well as a cross-linked insulated wire and a cable using the composition.

2. Description of the Related Art

Electric wires used in stock rolling, automobiles or electrical equipment etc. may need a high abrasion resistance, a low-temperature performance and flame retardancy etc. In order to have a high abrasion resistance, a resin composition is used for an insulation layer of wire which includes as a base a highly crystalline polymer such as high-density polyethylene (HDPE). In addition, a halogen-based flame retardant or a phosphorus-based flame retardant such as red phosphorus is used that allows flame retardancy even in small additive amount since the high-density polyethylene is low in filler acceptability.

However, since the halogen-based flame retardant may generate a halogen gas upon being heated, a problem may arise that they lack in concern for globally growing environmental issues. Alternatively, a problem may arise that the phosphorus-based flame retardant such as red phosphorus may generate phosphine upon being heated or may cause a groundwater contamination due to phosphoric acid generated upon being discarded.

In order to avoid the problems, flame-retardant resin compositions are proposed which include a high-density polyethylene as a base polymer and a metal hydroxide as a flame retardant (e.g., JP-A-2002-60557 and JP-A-2004-156026). JP-A-2002-60557 and JP-A-2004-156026 disclose the flame-retardant resin compositions in which the metal hydroxide is mixed with a polymer blend including the high-density polyethylene and an ethylene-acrylic ester-maleic anhydride terpolymer etc.

SUMMARY OF THE INVENTION

The flame-retardant resin compositions need to include a large amount of the metal hydroxide to sufficiently have the flame retardancy and thus may cause a decrease in mechanical characteristics, low-temperature properties and electrical characteristics.

It is an object of the invention to provide a crosslinkable halogen-free resin composition that is excellent in flame retardancy and exhibits excellent mechanical characteristics, low-temperature properties and electrical characteristics, as well as a cross-linked insulated wire and a cable using the composition.

(1) According to an embodiment of the invention, a crosslinkable halogen-free resin composition comprises:
a polymer blend; and
a metal hydroxide mixed in an amount of 120 to 200 parts by mass per 100 parts by mass of the polymer blend,
wherein the polymer blend comprises a high-density polyethylene, 30 to 50 parts by mass of an ethylene-acrylic ester-maleic anhydride terpolymer, 5 to 20 parts by mass of a maleic anhydride modified ethylene-α-olefin copolymer and 10 to 30 parts by mass of an ethylene-vinyl acetate copolymer.

In the above embodiment (1) of the invention, the following modifications and changes can be made.

(i) A glass-transition temperature of the maleic anhydride modified ethylene-α-olefin copolymer is not more than $-55°$ C.

(ii) An vinyl acetate content in the ethylene-vinyl acetate copolymer is not less than 10 mass %.

(iii) The metal hydroxide comprises one or both of magnesium hydroxide and aluminum hydroxide.

(2) According to another embodiment of the invention, a cross-linked insulated wire comprises:
a conductor; and
a insulation layer comprising a single layer or multiple layers and covering the periphery of the conductor,
wherein an outermost layer of the insulation layer comprises the crosslinkable halogen-free resin composition according to the embodiment (1).

In the above embodiment (2) of the invention, the following modifications and changes can be made.

(iv) The insulation layer comprises multiple layers, and wherein an innermost layer of the insulation layer in contact with the conductor comprises a crosslinkable halogen-free resin composition comprising a metal hydroxide mixed in an amount of not more than 100 parts by mass with 100 parts by mass of polyolefin.

(v) The metal hydroxide included in the innermost layer of the insulation layer comprises one or both of magnesium hydroxide and aluminum hydroxide.

(3) According to another embodiment of the invention, a cable comprises:
an insulated wire; and
a sheath covering a periphery of the insulated wire,
wherein the sheath comprises the crosslinkable halogen-free resin composition according to the embodiment (1).

Effects of the Invention

According to an embodiment of the invention, a crosslinkable halogen-free resin composition can be provided that is excellent in flame retardancy and exhibits excellent mechanical characteristics, low-temperature properties and electrical characteristics, as well as a cross-linked insulated wire and a cable using the composition.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Figure 1:
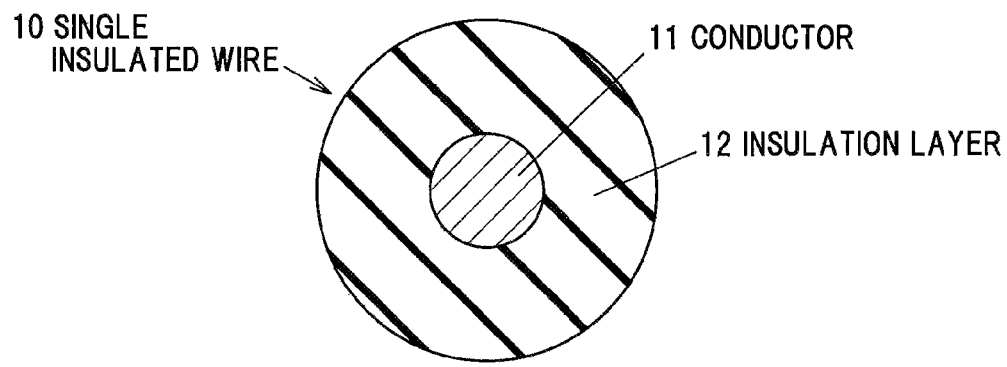
FIG. 1 is a radial cross sectional view showing a single insulated wire as a cross-linked insulated wire in a second embodiment.

Embodiments of the invention will be described below in reference to the drawings. Constituent elements having substantially the same functions are denoted by the same

First Embodiment

Crosslinkable Halogen-Free Resin Composition

A crosslinkable halogen-free resin composition in the first embodiment of the invention includes a metal hydroxide (B) mixed in an amount of 120 to 200 parts by mass with 100 parts by mass of a polymer blend (A) which is composed of a high-density polyethylene (A1), 30 to 50 parts by mass of an ethylene-acrylic ester-maleic anhydride terpolymer (A2), 5 to 20 parts by mass of a maleic anhydride modified ethylene-α-olefin copolymer (A3) and 10 to 30 parts by mass of an ethylene-vinyl acetate copolymer (A4).

That is, the crosslinkable halogen-free resin composition includes the polymer blend (A) and the metal hydroxide (B) mixed in the amount of 120 to 200 parts by mass per 100 parts by mass of the polymer blend (A).

The polymer blend (A) includes the high-density polyethylene (A1), the ethylene-acrylic ester-maleic anhydride terpolymer (A2), the maleic anhydride modified ethylene-α-olefin copolymer (A3) and the ethylene-vinyl acetate copolymer (A4).

Then, 30 to 50 parts by mass of the ethylene-acrylic ester-maleic anhydride terpolymer (A2), 5 to 20 parts by mass of the maleic anhydride modified ethylene-α-olefin copolymer (A3) and 10 to 30 parts by mass of the ethylene-vinyl acetate copolymer (A4) are included in 100 parts by mass of the polymer blend (A) (in terms of percent concentration by mass, the polymer blend (A) includes 30 to 50 mass % of the ethylene-acrylic ester-maleic anhydride terpolymer (A2), 5 to 20 mass % of the maleic anhydride modified ethylene-α-olefin copolymer (A3) and 10 to 30 mass % of the ethylene-vinyl acetate copolymer (A4)).

In the crosslinkable halogen-free resin composition, a polymer component other than the polymer blend (A) may be included as a base polymer as long as the effect of the resin composition is exerted. However, the polymer blend (A) included in the base polymer is exemplarily not less than 90 mass %, more exemplarily not less than 95 mass %, further exemplarily 100 mass % (the base polymer consists of only the polymer blend (A)).

In addition, it is possible, if necessary, to add a crosslinking agent, a crosslinking aid, a flame-retardant aid, an ultraviolet absorber, a light stabilizer, a softener, a lubricant, a colorant, a reinforcing agent, a surface active agent, an inorganic filler, a plasticizer, a metal chelator, a foaming agent, a compatibilizing agent, a processing aid and a stabilizer, etc., to the crosslinkable halogen-free resin composition.

Filler acceptability is different between the high-density polyethylene (A1) and the ethylene-vinyl acetate copolymer (A4), while adhesion at polymer/filler interface and low-temperature properties are different between the ethylene-acrylic ester-maleic anhydride terpolymer (A2) and the maleic anhydride modified ethylene-α-olefin copolymer (A3).

It is considered that, in the polymer blend (A), the high-density polyethylene (A1) can have higher filler acceptability by compatibilizing with the maleic anhydride modified ethylene-α-olefin copolymer (A3), and also, abrasion resistance and low-temperature properties are improved. Meanwhile, it is considered that the ethylene-vinyl acetate copolymer (A4) provides improved elongation characteristics by compatibilizing with the ethylene-acrylic ester-maleic anhydride terpolymer (A2), and also, the polymer/filler interface is strengthened and electrical characteristics are improved. Therefore, although the crosslinkable halogen-free resin composition in the first embodiment includes the metal hydroxide in an amount that allows sufficient flame retardancy to be obtained, mechanical characteristics, low-temperature properties and electrical characteristics are sufficient, and also mechanical characteristics, electrical characteristics and flame retardancy are in very good balance. Mechanical characteristics, electrical characteristics low-temperature properties and flame retardancy of the crosslinkable halogen-free resin composition described herein are the properties after cross-linking High-Density Polyethylene (A1)

The density of the high-density polyethylene (A1) is not less than 0.942, and melting point and molecular weight thereof are not specifically limited.

The amount of the high-density polyethylene (A1) included in 100 parts by mass of the polymer blend (A) is not more than 55 parts by mass, exemplarily 30 to 45 parts by mass.

Ethylene-Acrylic Ester-Maleic Anhydride Terpolymer (A2)

The ethylene-acrylic ester-maleic anhydride terpolymer (A2) has high adhesion to fillers due to including a larger amount of maleic anhydride than graft copolymer and improves mechanical strength of the crosslinkable halogen-free resin composition. The ethylene-acrylic ester-maleic anhydride terpolymer (A2) is particularly effective to improve abrasion resistance.

The amount of the ethylene-acrylic ester-maleic anhydride terpolymer (A2) included in 100 parts by mass of the polymer blend (A) is 30 to 50 parts by mass, as described above. When the amount of the ethylene-acrylic ester-maleic anhydride terpolymer (A2) is less than 30 parts by mass, abrasion resistance of the crosslinkable halogen-free resin composition is not sufficient. On the other hand, when more than 50 parts by mass, elongation characteristics of the crosslinkable halogen-free resin composition are not sufficient.

Examples of the ethylene-acrylic ester-maleic anhydride terpolymer (A2) include ethylene-methyl acrylate-maleic anhydride terpolymer, ethylene-ethyl acrylate-maleic anhydride terpolymer and ethylene-butyl acrylate-maleic anhydride terpolymer, etc., which can be used alone or in combination of two or more.

Although the acrylic ester content and the maleic anhydride content in the ethylene-acrylic ester-maleic anhydride terpolymer (A2) are not specifically limited, the ethylene-acrylic ester-maleic anhydride terpolymer (A2) exemplarily include 5 to 30 mass % of acrylic ester and 2.8 to 3.6 mass % of maleic anhydride from the viewpoint of adhesion to filler.

Maleic Anhydride Modified Ethylene-α-Olefin Copolymer (A3)

Ethylene-α-olefin copolymer is excellent in flexibility in a low-temperature environment and can have stronger adhesion to filler such as magnesium hydroxide when modified with maleic anhydride. Therefore, low-temperature properties of the crosslinkable halogen-free resin composition can be improved by the maleic anhydride modified ethylene-α-olefin copolymer (A3).

The amount of the maleic anhydride modified ethylene-α-olefin copolymer (A3) included in 100 parts by mass of the polymer blend (A) is 5 to 20 parts by mass, as described above. When the amount of the maleic anhydride modified ethylene-α-olefin copolymer (A3) is less than 5 parts by mass, low-temperature properties of the crosslinkable halogen-free resin composition are not sufficient. On the other hand, when more than 20 parts by mass, abrasion resistance of the crosslinkable halogen-free resin composition is not sufficient.

As the ethylene-α-olefin copolymer, it is possible to use, e.g., a copolymer of ethylene and α-olefin having 3 to 12 carbon atoms. Examples of the copolymer of ethylene and α-olefin having 3 to 12 carbon atoms include propylene, 1-butene, 1-pentene, 1-hexene, 4-methyl-pentene, 1-heptene and 1-octene, etc., which can be used alone or in combination of two or more. It is particularly exemplary to use 1-butene.

To further improve low-temperature properties of the crosslinkable halogen-free resin composition, the maleic anhydride modified ethylene-α-olefin copolymer (A3) exemplarily has a glass-transition temperature of not more than −55° C., more exemplarily, not more than −65° C.

Ethylene-Vinyl Acetate Copolymer (A4)

The ethylene-vinyl acetate copolymer (A4) has high filler acceptability and also has high flame retardancy since the endothermic effect due to deacetylation is exerted when burnt. In addition, maleic anhydride or vinylsilane may be grafted onto the ethylene-vinyl acetate copolymer (A4).

The amount of the ethylene-vinyl acetate copolymer (A4) included in 100 parts by mass of the polymer blend (A) is 10 to 30 parts by mass, as described above. When the amount of the ethylene-vinyl acetate copolymer (A4) is less than 10 parts by mass, elongation characteristics and low-temperature properties of the crosslinkable halogen-free resin composition are not sufficient. On the other hand, when more than 30 parts by mass, abrasion resistance of the crosslinkable halogen-free resin composition is not sufficient.

In addition, the vinyl acetate content in the ethylene-vinyl acetate copolymer (A4) is exemplarily larger and is exemplarily not less than 10 mass %.

Metal Hydroxide (B)

The amount of the metal hydroxide (B) included in the crosslinkable halogen-free resin composition is 120 to 200 parts by mass per 100 parts by mass of the polymer blend (A), as described above. When the amount of the metal hydroxide (B) is less than 120 parts by mass, flame retardancy of the crosslinkable halogen-free resin composition is not sufficient. On the other hand, when more than 200 parts by mass, elongation characteristics of the crosslinkable halogen-free resin composition are not sufficient.

Examples of the metal hydroxide (B) include aluminum hydroxide, magnesium hydroxide and calcium hydroxide, etc., which can be used alone or in combination of two or more. Of those, magnesium hydroxide is exemplary as the metal hydroxide (B) since a temperature at which main dehydration reaction proceeds is as high as 350° C. and excellent flame retardancy is obtained.

In view of dispersibility, etc., the metal hydroxide (B) may be surface-treated with fatty acid, etc. Examples of the fatty acid include silane coupling agent, titanate coupling agent and stearic acid, etc., which can be used alone or in combination of two or more. It is exemplary to treat the surface with a silane coupling agent particularly when high heat resistance is required.

Cross-Linking Method

A method of cross-linking the crosslinkable halogen-free resin composition in the first embodiment can be a conventionally known treatment method such as chemical cross-linking using an organic peroxide, a sulfur compound or a silane compound, etc., radiation-crosslinking performed by exposure to electron beam or radiation, or cross-linking using other chemical reactions, etc., and any cross-linking method can be used.

Second Embodiment

The second embodiment of the invention is a cross-linked insulated wire having an insulation layer formed of the crosslinkable halogen-free resin composition in the first embodiment.

FIG. 1 is a radial cross sectional view showing a single insulated wire 10 as a cross-linked insulated wire in the second embodiment.

The single insulated wire 10 has a linear conductor 11 and an insulation layer 12 covering the periphery of the conductor 11. The insulation layer of the single insulated wire 10 is a single layer consisting of only the insulation layer 12. Therefore, the insulation layer 12 is the outermost layer of the single insulated wire 10.

As a material of the conductor 11, it is possible to use a known material such as copper, soft copper, silver or aluminum. The surface of such materials can be plated with tin, nickel, silver or gold to improve heat resistance.

The insulation layer 12 is formed of the crosslinkable halogen-free resin composition in the first embodiment. Therefore, the single insulated wire 10 is excellent in mechanical characteristics such as elongation characteristics or abrasion resistance, low-temperature properties such as low-temperature bending properties, electrical characteristics such as DC stability and flame retardancy. The insulation layer 12 is, e.g., extruded on the conductor 11 and is then cross-linked.

Third Embodiment

The cross-linked insulated wire in the third embodiment is a double insulated wire and is different from the single insulated wire as a cross-linked insulated wire in the second embodiment in that the insulation layer is composed of multiple layers.

Figure 2:
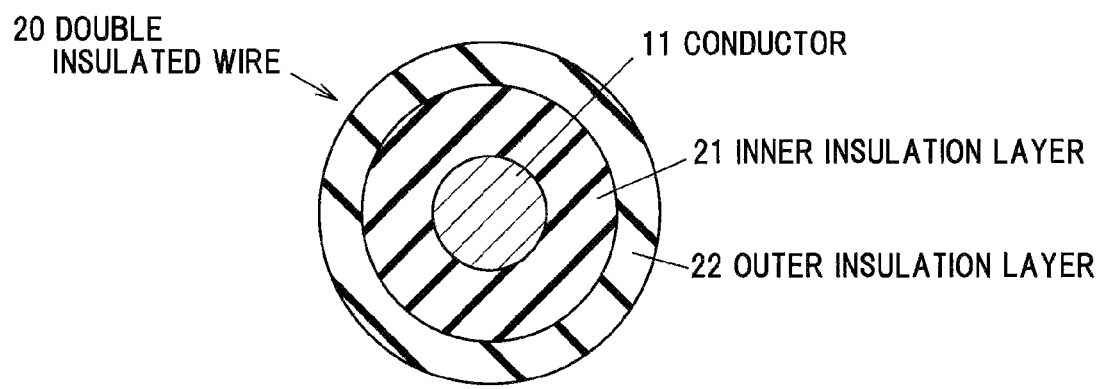
FIG. 2 is a radial cross sectional view showing a double insulated wire as a cross-linked insulated wire in a third embodiment.

FIG. 2 is a radial cross sectional view showing a double insulated wire 20 as a cross-linked insulated wire in the third embodiment.

The double insulated wire 20 has the linear conductor 11, an inner insulation layer 21 covering the periphery of the conductor 11, and an outer insulation layer 22 covering the periphery of the inner insulation layer 21. The insulation layer of the double insulated wire 20 is composed of two layers, the inner insulation layer 21 and the outer insulation layer 22. Therefore, the inner insulation layer 21 is the innermost layer of the double insulated wire 20 and the outer insulation layer 22 is the outermost layer of the double insulated wire 20.

The outer insulation layer 22 is formed of the crosslinkable halogen-free resin composition in the same manner as the insulation layer 12 in the second embodiment. Therefore, the double insulated wire 20 is excellent in mechanical characteristics such as elongation characteristics or abrasion resistance, low-temperature properties such as low-temperature bending properties, electrical characteristics such as DC stability and flame retardancy.

The inner insulation layer 21 is exemplarily formed of a material not including halogen. In case that electrical characteristics are important, the inner insulation layer 21 is exemplarily formed of a resin composition in which not more than 100 parts by mass of metal hydroxide is mixed with 100 parts by mass of polymer component. More than 100 parts by mass of metal hydroxide may cause a decrease in electrical characteristics of the inner insulation layer 21.

As the polymer component in the inner insulation layer 21, it is possible to use, e.g., polyolefin. Examples of the polyolefin include high-density polyethylene, medium-density polyethylene, low-density polyethylene, very low-density polyethylene and ethylene-acrylic ester copolymer, etc., which can be used alone or in combination of two or more.

The inner insulation layer 21 and the outer insulation layer 22 are, e.g., simultaneously extruded on the conductor 11 and are then cross-linked.

The double insulated wire 20 may include another layer between the inner insulation layer 21 and the outer insulation layer 22.

Fourth Embodiment

The fourth embodiment of the invention is a cable having a sheath formed of the crosslinkable halogen-free resin composition in the first embodiment.

Figure 3:
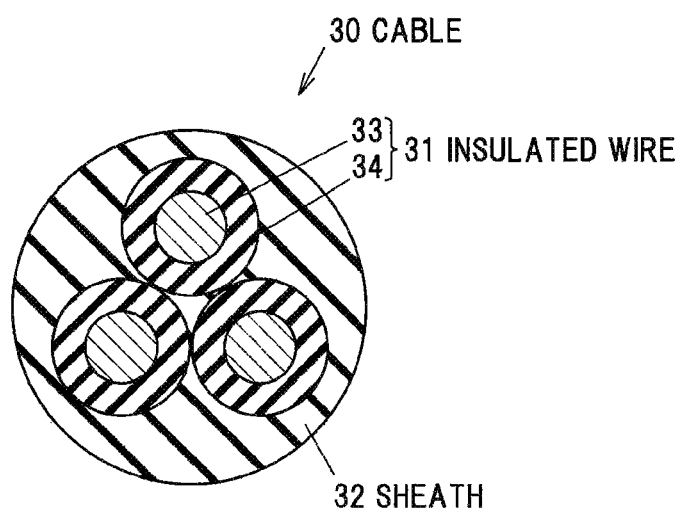
FIG. 3 is a radial cross sectional view showing a cable in a fourth embodiment.

FIG. 3 is a radial cross sectional view showing a cable 30 in the fourth embodiment.

The cable 30 has insulated wires 31 and a sheath 32 covering the periphery of the insulated wires 31.

The insulated wire 31 has a conductor 33 and an insulation layer 34 covering the periphery of the conductor 33. Materials of the conductor 33 and the insulation layer 34 are not specifically limited, and the conductor 33 and the insulation layer 34 can be respectively formed of known materials. The single insulated wire 10 in the second embodiment or the double insulated wire 20 in the third embodiment may be used as the insulated wire 31. Although the cable 30 in the example shown in FIG. 3 has three insulated wires 31, the number of the insulated wires 31 used in the cable 30 is not specifically limited.

The sheath 32 is formed of the crosslinkable halogen-free resin composition in the first embodiment. Therefore, the cable 30 is excellent in mechanical characteristics such as elongation characteristics or abrasion resistance, low-temperature properties such as low-temperature bending properties, electrical characteristics such as DC stability and flame retardancy. The sheath 32 is molded and is then cross-linked The cable 30 may have, if necessary, other members such as braided wire.

Effects of the Embodiments

According to the first to fourth embodiments, it is possible to provide a crosslinkable halogen-free resin composition, a cross-linked insulated wire and a cable which are excellent in flame retardancy and at the same time exhibit excellent mechanical characteristics, low-temperature properties and electrical characteristics.

EXAMPLES

Examples of the invention will be described below in more detail. However, the following examples are not intended to limit the invention in any way.

Examples 1 to 14 and Comparative Examples 1 to 9

The cross-linked insulated wires shown in FIGS. 1 and 2 were made as follows.

(1) A tin-plated conductor (37 strands×0.18 mm diameter) was used as the conductor 11.

(2) Resin compositions were formed by mixing and kneading components shown in Tables 1 and 2 using a 14-inch open roll mill and were then pelletized using a granulator, thereby obtaining an outer layer material and an inner layer material.

(3) For making the single insulated wire 10 in FIG. 1, the insulation layer 12 was formed by extruding the obtained outer layer material on the conductor 11 using a 40-mm extruder so as to have a thickness of 0.26 mm (4) For making the double insulated wire 20 in FIG. 2, the inner insulation layer 21 and the outer insulation layer 22 were formed by simultaneously extruding the obtained inner and outer layer materials on the conductor 11 using a 40-mm extruder so as to respectively have thicknesses of 0.1 mm and 0.16 mm (5) An electron beam (radiation dose of 15 Mrad) was irradiated on the obtained insulated wires to cross-link each insulation layer.

The obtained cross-linked insulated wires were evaluated by the following various evaluation tests. Tables 1 and 2 show the evaluation results.

(1) Tensile Test

The insulation layers after pulling out the conductors 11 were subjected to the tensile test at a tension rate of 200 mm/min. The samples passed the tensile test (○) when elongation at break in the test was not less than 50%, and the samples failed the test (×) when elongation at break was less than 50%.

(2) Low-Temperature Bend Test

Each cross-linked insulated wire was left in a cryostat at −40° C. for not less than 4 hours and was then wound 6 turns around a 1.75 mm-diameter mandrel and a 7.0 mm-diameter mandrel. The wires of which insulation layer did not crack when wound around the 1.75 mm-diameter and 7.0 mm-diameter mandrels were regarded as "◉ (excellent)", those of which insulation layer did not crack when wound around the 7.0 mm-diameter mandrel but cracked when wound around the 1.75 mm-diameter mandrel were regarded as "○ (good)", and those of which insulation layer cracked when wound around the 1.75 mm-diameter mandrel as well as when wound around and the 7.0 mm-diameter mandrel were regarded as "× (bad)".

(3) Flame-Retardant Test 600 mm-long cross-linked insulated wires were held vertical and a flame was applied thereto for 60 seconds. The wires passed the test (○) when the flame was extinguished within 60 seconds after removing the flame, and the wires failed the test (×) when the flame was not extinguished within 60 seconds.

(4) Abrasion Resistance Test

An abrasion resistance test in accordance with EN 50305.5.2 was conducted on each cross-linked insulated wire. The insulation layer was worn away by reciprocating a steel blade while applying a load on the insulated layer. The wires passed the test (○) when reciprocating frequency of the blade (the number of cycles of abrasion) until the blade reached the conductor 11 was not less than 150 cycles, and the wires failed the test (×) when less than 150 cycles.

(5) Electrical Characteristic Rest

A 300V DC stability test in accordance with EN 50305.6.7 was conducted on each cross-linked insulated wire. The wires with no short-circuit for 240 hours were regarded as "excellent (◉)", those short-circuited in not less than 100 hours and less than 240 hours were regarded as "good (○)", and those short-circuited in less than 100 hours were regarded as "acceptable (Δ)".

(6) Overall Evaluation

The overall evaluation was rated as "Passed (◉)" when all evaluation results in the above-mentioned tests were "◉" or "○", rated as "Passed (○)" when "Δ" was included, and rated as "Failed (×)" when "×" was included.

TABLE 1

Examples (proportions are indicated in parts by mass based on 100 parts by mass of the entire polymer component)

| | Items | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Outer layer material | HDPE[1) | 30 | 35 | 30 | 30 | 30 | 30 | 45 | 30 | 30 | 30 | 30 | 30 | 30 | 30 |
| | Ethylene ethyl acrylate maleic anhydride terpolymer[2) | 35 | 30 | 50 | 40 | 40 | 35 | 35 | 30 | 30 | 30 | 30 | 30 | 30 | 30 |
| | Maleic anhydride modified ethylene-α-olefin copolymer[3) | 10 | 10 | 10 | 5 | | 20 | 10 | 10 | 10 | 10 | 10 | 10 | 10 | 10 |
| | Maleic anhydride modified ethylene-α-olefin copolymer[4) | | | | | 5 | | | | | | | | | |
| | Ethylene-vinyl acetate copolymer[5) | 25 | 25 | 10 | 25 | 25 | 15 | 10 | 30 | 30 | 30 | 30 | 30 | 30 | 30 |
| | Magnesium hydroxide[6) | 170 | 170 | 170 | 170 | 170 | 170 | 170 | 170 | 200 | 120 | 200 | 200 | 120 | |
| | Aluminum hydroxide[7) | | | | | | | | | | | | | | 120 |
| Inner layer material | LDPE[8) | 100 | 100 | 100 | 100 | 100 | 100 | 100 | 100 | 100 | 100 | 100 | 100 | | |
| | Magnesium hydroxide[6) | | | | | | | | | | | 100 | 150 | | |
| Evaluation | Radiation dose (Mrad) | 15 | 15 | 15 | 15 | 15 | 15 | 15 | 15 | 15 | 15 | 15 | 15 | 15 | 15 |
| | Elongation at break (%) | 75 | 70 | 50 | 70 | 70 | 65 | 50 | 85 | 50 | 10 | 50 | 50 | 110 | 105 |
| | Judgement | ○ | ○ | ○ | ○ | ○ | ○ | ○ | ○ | ○ | ○ | ○ | ○ | ○ | ○ |
| | Low-temperature bend test | ◎ | ◎ | ○ | ○ | ◎ | ◎ | ○ | ◎ | ○ | ◎ | ○ | ○ | ◎ | ◎ |
| | Flame retardant test | ○ | ○ | ○ | ○ | ○ | ○ | ○ | ○ | ○ | ○ | ○ | ○ | ○ | ○ |
| | Cycles of abrasion | 195 | 247 | 298 | 277 | 277 | 158 | 488 | 170 | 164 | 165 | 163 | 160 | 160 | 165 |
| | Judgement | ○ | ○ | ○ | ○ | ○ | ○ | ○ | ○ | ○ | ○ | ○ | ○ | ○ | ○ |
| | DC stability: time to short circuit (h) | 240 | 240 | 240 | 240 | 240 | 240 | 240 | 240 | 240 | 240 | 120 | 50 | 20 | 25 |
| | Judgement | ◎ | ◎ | ◎ | ◎ | ◎ | ◎ | ◎ | ◎ | ◎ | ◎ | ○ | △ | △ | △ |
| | Overall evaluation | ◎ | ◎ | ◎ | ◎ | ◎ | ◎ | ◎ | ◎ | ◎ | ◎ | ◎ | ○ | ○ | ○ |

[1) HI-ZEX 5305E from Prime Polymer,
[2) BONDINE LX4110 from Arkema (maleic anhydride content: 3 wt %, acrylic ester content: 5 wt %),
[3) TAFMER MA8510 from Mitsui Chemicals (glass-transition temperature: −55° C.),
[4) TAFMER MH7020 from Mitsui Chemicals (glass-transition temperature: −65° C.),
[5) Evaflex P1007 from Mitsui Chemicals (vinyl acetate content: 10 wt %),
[6) Kisuma 5L from Kyowa Chemical Industry,
[7) BF013STV from Nippon Light Metal,
[8) MIRASON 3530 from Prime Polymer

TABLE 2

Comparative Examples (proportions are indicated in parts by mass based on 100 parts by mass of the entire polymer component)

| | Items | 1 | 2 | 3 | 4 | 5 | 6 | 7 | 8 | 9 |
|---|---|---|---|---|---|---|---|---|---|---|
| Outer layer material | HDPE[1) | | 30 | 30 | 30 | 30 | 50 | 30 | 30 | 30 |
| | LDPE[2) | 25 | | | | | | | | |
| | Ethylene-ethyl acrylate-maleic anhydride terpolymer[3) | 40 | 25 | 55 | 45 | 35 | 35 | 30 | 30 | 30 |
| | Maleic anhydride modified ethylene-α-olefin copolymer[4) | 10 | 20 | 5 | 0 | 25 | 10 | 5 | 10 | 10 |
| | Ethylene-vinyl acetate copolymer[5) | 25 | 25 | 10 | 25 | 10 | 5 | 35 | 30 | 30 |
| | Magnesium hydroxide[6) | 170 | 170 | 170 | 170 | 170 | 170 | 170 | 210 | 110 |
| Inner layer material | LDPE[2) | 100 | 100 | 100 | 100 | 100 | 100 | 100 | | |
| Evaluation | Radiation dose (Mrad) | 15 | 15 | 15 | 15 | 15 | 15 | 15 | 15 | 15 |
| | Elongation at break (%) | 70 | 90 | 40 | 65 | 60 | 20 | 90 | 40 | 120 |
| | Judgement | ○ | ○ | X | ○ | ○ | X | ○ | X | ○ |
| | Low-temperature bend test | ◎ | ◎ | ○ | X | ◎ | X | ○ | ○ | ◎ |
| | Flame retardant test | ○ | ○ | ○ | ○ | ○ | ○ | ○ | ○ | X |
| | Cycles of abrasion | 138 | 140 | 250 | 295 | 117 | 515 | 130 | 155 | 160 |
| | Judgement | X | X | ○ | ○ | X | ○ | X | ○ | ○ |
| | DC stability: Time to Short circuit (h) | 240 | 240 | 240 | 240 | 240 | 240 | 240 | 5 | 25 |
| | Judgement | ◎ | ◎ | ◎ | ◎ | ◎ | ◎ | ◎ | △ | △ |
| | Overall evaluation | X | X | X | X | X | X | X | X | X |

[1) HI-ZEX 5305E from Prime Polymer,
[2) MIRASON 3530 from Prime Polymer,
[3) BONDINE LX4110 from Arkema (maleic anhydride content: 3 wt %, acrylic ester content: 5 wt %),
[4) TAFMER MA8510 from Mitsui Chemicals (glass-transition temperature: −55° C.),
[5) Ultrasen 520F from Tosoh Corporation (vinyl acetate content: 8 wt %),
[6) Kisuma 5L from Kyowa Chemical Industry In Examples 1 to 11, all evaluation results were "⊚" or "◯" as shown in Table 1 and the overall evaluation was thus rated as "Passed (⊚)".

In Example 12, the result in the electrical characteristic test (DC stability test) was "Δ" since the sample short-circuited in 50 hours but the results in the other tests were "◯". Therefore, the overall evaluation was rated as "Passed (◯)".

In Example 13, the result in the electrical characteristic test (DC stability test) was "Δ" since the sample short-circuited in 20 hours but the results in the other tests were "◯". Therefore, the overall evaluation was rated as "Passed (◯)".

In Example 14, the result in the electrical characteristic test (DC stability test) was "Δ" since the sample short-circuited in 25 hours but the results in the other tests were "◯".

Therefore, the overall evaluation was rated as "Passed (◯)".

In Comparative Example 1, since a low-density polyethylene was used in the outer layer material instead of using the high-density polyethylene as shown in Table 2, the number of cycles of abrasion was as small as 138 and the result was "Failed (×)". Therefore, the overall evaluation was rated as "Failed (×)".

In Comparative Example 2, since the amount of the ethylene-ethyl acrylate-maleic anhydride terpolymer included in the outer layer material was too small, the number of cycles of abrasion was as small as 140 and the result was "Failed (×)". Therefore, the overall evaluation was rated as "Failed (×)". In Comparative Example 3, since the amount of the ethylene-ethyl acrylate-maleic anhydride terpolymer included in the outer layer material was too large, elongation at break was as low as 40% and the result was "Failed (×)". Therefore, the overall evaluation was rated as "Failed (×)".

In Comparative Example 4, since the maleic anhydride modified ethylene-α-olefin copolymer was not added to the outer layer material, cracks were generated in the low-temperature bend test when wound around the 1.75 mm-diameter and 7.0 mm-diameter mandrels and the result was "Failed (×)". Therefore, the overall evaluation was rated as "Failed (×)".

In Comparative Example 5, since the amount of the maleic anhydride modified ethylene-α-olefin copolymer included in the outer layer material was too large, the number of cycles of abrasion was as small as 117 and the result was "Failed (×)". Therefore, the overall evaluation was rated as "Failed (×)".

In Comparative Example 6, since the amount of the ethylene-vinyl acetate copolymer included in the outer layer material was too small, elongation at break was as very low as 20% and the result was "Failed (×)". In addition, cracks were generated in the low-temperature bend test when wound around the 1.75 mm-diameter and 7.0 mm-diameter mandrels and the result was "Failed (×)". Therefore, the overall evaluation was rated as "Failed (×)". In Comparative Example 7, since the amount of the ethylene-vinyl acetate copolymer included in the outer layer material was too large, the number of cycles of abrasion was as small as 130 and the result was "Failed (×)". Therefore, the overall evaluation was rated as "Failed (×)".

In Comparative Example 8, since the amount of the magnesium hydroxide included in the outer layer material was too large, elongation at break was as low as 40% and the result was "Failed (×)". In addition, the sample short-circuited in 5 hours in the electrical characteristic test (DC stability test) and the result was "acceptable Δ". Therefore, the overall evaluation was rated as "Failed (×)".

In Comparative Example 9, since the amount of the magnesium hydroxide included in the outer layer material was too small, the sample was completely burnt and the result was "Failed (×)". In addition, the sample short-circuited in 25 hours in the electrical characteristic test (DC stability test) and the result was "acceptable Δ". Therefore, the overall evaluation was rated as "Failed (×)".

The above results demonstrate that, in order to obtain a cross-linked insulated wire and a cable which are excellent in mechanical characteristics, low-temperature performance, electrical characteristics and flame retardancy, a resin composition constituting the outermost layer of an insulation layer or a sheath needs to be a crosslinkable halogen-free resin composition in which a metal hydroxide is mixed in an amount of 120 to 200 parts by mass with 100 parts by mass of a polymer blend composed of a high-density polyethylene, 30 to 50 parts by mass of an ethylene-acrylic ester-maleic anhydride terpolymer, 5 to 20 parts by mass of a maleic anhydride modified ethylene-α-olefin copolymer and 10 to 30 parts by mass of an ethylene-vinyl acetate copolymer.

Although the embodiments and Examples of the invention have been described, the invention is not intended to be limited to the embodiments and Examples, and the various kinds of modifications can be implemented without departing from the gist of the invention.

In addition, the invention according to claims is not to be limited to the embodiments and Examples. Further, please note that all combinations of the features described in the embodiments and Examples are not necessary to solve the problem of the invention.

What is claimed is:

1. A cross-linked insulated wire, comprising:
   a conductor; and
   an insulation layer comprising a single layer or multiple layers and covering the periphery of the conductor,
   wherein an outermost layer of the insulation layer comprises a crosslinkable halogen-free resin composition, the crosslinkable halogen-free resin composition comprising:
   a polymer blend; and
   a metal hydroxide mixed in an amount of 120 to 200 parts by mass per 100 parts by mass of the polymer blend,
   wherein the polymer blend comprises a high-density polyethylene, 30 to 50 parts by mass of an ethylene-acrylic ester-maleic anhydride terpolymer, 5 to 20 parts by mass of a maleic anhydride modified ethylene-α-olefin copolymer and 10 to 30 parts by mass of an ethylene-vinyl acetate copolymer,
   wherein the insulation layer comprises multiple layers, and
   wherein an innermost layer of the insulation layer in contact with the conductor comprises a crosslinkable halogen-free resin composition comprising a metal hydroxide mixed in an amount of not more than 100 parts by mass with 100 parts by mass of polyolefin.

2. The cross-linked insulated wire according to claim 1, wherein a glass-transition temperature of the maleic anhydride modified ethylene-α-olefin copolymer is not more than −55° C.

3. The cross-linked insulated wire according to claim 1, wherein a vinyl acetate content in the ethylene-vinyl acetate copolymer is not less than 10 mass %.

4. The cross-linked insulated wire according to claim 1, wherein the metal hydroxide of the outermost layer comprises one or both of magnesium hydroxide and aluminum hydroxide.

5. The cross-linked insulated wire according to claim 1, wherein the metal hydroxide included in the innermost layer of the insulation layer comprises one or both of magnesium hydroxide and aluminum hydroxide.

* * * * *